(12) United States Patent
Stuart et al.

(10) Patent No.: US 8,479,491 B2
(45) Date of Patent: Jul. 9, 2013

(54) CLAMPING SYSTEM AND METHOD FOR THRUST REVERSER ATTACHMENT

(75) Inventors: Alan Roy Stuart, Cincinnati, OH (US); John Robert Fehrmann, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/325,203

(22) Filed: Dec. 14, 2011

(65) Prior Publication Data

US 2012/0304621 A1    Dec. 6, 2012

Related U.S. Application Data

(60) Provisional application No. 61/493,671, filed on Jun. 6, 2011.

(51) Int. Cl.
| | |
|---|---|
| *B05B 12/00* | (2006.01) |
| *F02K 3/02* | (2006.01) |
| *F02K 1/54* | (2006.01) |
| *F02C 7/20* | (2006.01) |

(52) U.S. Cl.
USPC .................. 60/226.2; 60/798; 244/110 B

(58) Field of Classification Search
USPC ............ 60/226.2, 230, 796–800; 244/110 B; 239/265.37, 265.39, 265.29, 265.25
See application file for complete search history.

(56) References Cited

U.S. PATENT DOCUMENTS

| | | | | |
|---|---|---|---|---|
| 5,875,995 A | * | 3/1999 | Moe et al. ................. | 244/110 B |
| 5,941,061 A | * | 8/1999 | Sherry et al. .................... | 60/798 |
| 7,434,303 B2 | | 10/2008 | Maguire | |
| 2010/0148012 A1 | | 6/2010 | McDonough et al. | |

* cited by examiner

*Primary Examiner* — Gerald L Sung
(74) *Attorney, Agent, or Firm* — General Electric Company; David J. Clement; Sushupta T. Sudarshan

(57) ABSTRACT

A method and system suitable facilitating the connection and disconnection of a thrust reverser assembly to a fan case of a nacelle of a gas turbine engine. The method and system entail operating a clamping system to simultaneously engage and disengage flanges associated with the fan case and flanges associated with the fixed structure of the thrust reverser assembly. The clamping system includes a plurality of over-center clamping mechanisms, each of which is movable to simultaneously clamp together complementary flanges of the thrust reverser assembly and the fan case.

20 Claims, 5 Drawing Sheets

CLAMPING SYSTEM AND METHOD FOR THRUST REVERSER ATTACHMENT

CROSS REFERENCE TO RELATED APPLICATIONS

This application claims the benefit of U.S. Provisional Application No. 61/493,671, filed Jun. 6, 2011, the contents of which are incorporated herein by reference.

BACKGROUND OF THE INVENTION

The present invention relates to mechanisms by which nacelle components of a turbofan gas turbine engine can be coupled and decoupled.

FIG. 1 schematically represents a high-bypass turbofan engine 10 of a type known in the art. The engine 10 is schematically represented as including a nacelle 12 and a core engine (module) 14. A fan assembly 16 located in front of the core engine 14 includes a spinner nose 20 projecting forwardly from an array of fan blades 18. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate additional engine thrust. The bypassed air passes through an annular-shaped bypass duct 30 between the nacelle 12 and an inner core cowl 36 of the core engine 14, and exits the duct 30 through a fan exit nozzle 32. The core cowl 36 defines the radially inward boundary of the bypass duct 30, and provides an aft core cowl transition surface to a primary exhaust nozzle 38 that extends aftward from the core engine 14.

The nacelle 12 is typically composed of three primary elements that define the external boundaries of the nacelle 12: an inlet assembly 12A, a fan cowl 12B including a fan case that surrounds the fan blades 18, and a thrust reverser assembly 12C located aft of the fan cowl 12B. The thrust reverser assembly 12C comprises four primary components: a translating cowl 34A mounted to the nacelle 12, the inner core cowl 36 of the core engine 14, a cascade 34B schematically represented within the nacelle 12, and a blocker door 34C schematically represented as being pivotally deployed from a position radially inward from the cascade 34B. The bypassed fan air flows between fan duct flow surfaces defined by the translating cowl 34 and the core cowl 36 before being exhausted through the fan exit nozzle 32. The translating cowl 34 translates to expose the cascade 34B and cause the blocker door 34C to deploy and divert bypassed air through the exposed cascade 34B.

In recent engine systems, the thrust reverser assembly 12C has been configured to separate from the fan cowl 12B and translate aft to allow access to the core cowl 36 and the core compartment of the core engine 14. Such a configuration requires the ability to connect and disconnect a fixed structure of the thrust reverser assembly 12C (which includes the cascade 34B) at a fixed structure (generally, the fan case) surrounded by the fan cowl 12B.

BRIEF DESCRIPTION OF THE INVENTION

The present invention provides a method and system suitable facilitating the connection and disconnection of a thrust reverser assembly to a fan case of a nacelle of a gas turbine engine. The invention is particularly well suited for use with a thrust reverser assembly comprising a fixed structure configured to be translated to couple and decouple the fixed structure from the fan case.

According to a first aspect of the invention, the clamping system comprises flanges associated with the fan case, flanges associated with the fixed structure of the thrust reverser assembly and adapted for simultaneous mating with the flanges of the fan case, and a plurality of over-center clamping mechanisms. A first of the over-center clamping mechanisms is mounted to the thrust reverser assembly and adapted to clamp a first of the flanges of the thrust reverser assembly with a first of the flanges of the fan case. A second of the over-center clamping mechanisms is mounted to the fan case and adapted to clamp a second of the flanges of the thrust reverser assembly with a second of the flanges of the fan case.

According to a second aspect of the invention, a method of coupling and decoupling a fan case and thrust reverser assembly entails operating a clamping system to simultaneously engage and disengage flanges associated with a fixed structure of the thrust reverser assembly and flanges associated with the fan case. The operating step comprises movement of a plurality of over-center clamping mechanisms to clamp together the flanges of the thrust reverser assembly and the fan case.

A technical effect of the invention is the ability of the clamping system to quickly and reliably connect and disconnect a thrust reverser assembly to a fan case of a gas turbine engine using multiple/redundant connections. The clamping system also offers the advantages of low weight, compactness, no conflicts with service line routing, ease of operation, and reduced risk for jams or improper seating due to friction.

Other aspects and advantages of this invention will be better appreciated from the following detailed description.

DETAILED DESCRIPTION OF THE INVENTION

Figure 1:
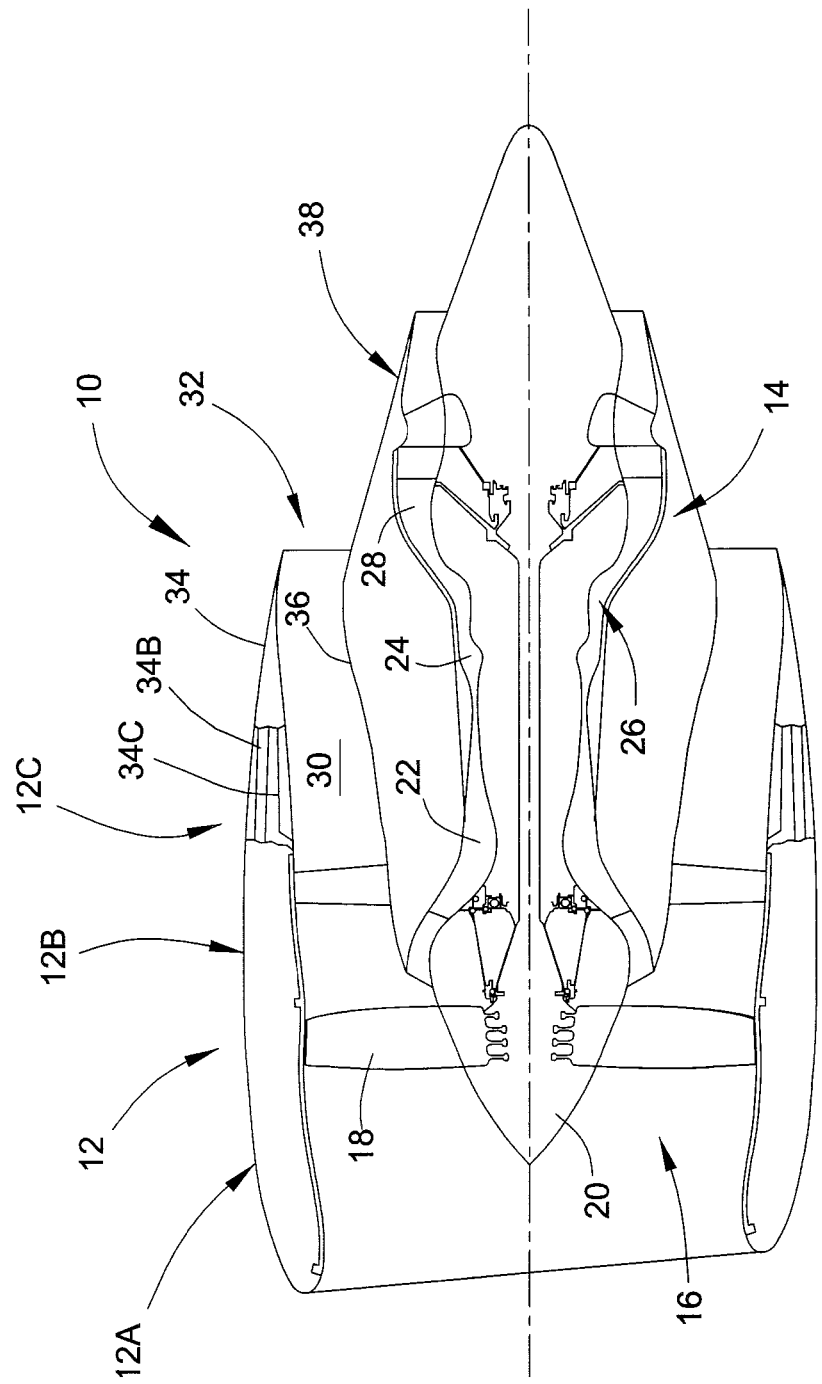
FIG. 1 schematically represents a cross-sectional view of a high-bypass turbofan engine.

FIGS. 2 through 6 represent various views of an assembly 40 through which a fan case and thrust reverser assembly of a gas turbine engine can be quickly coupled and decoupled to allow the thrust reverser assembly to translate aft and away from the fan case, for example, on one or more slider tracks (not shown). The assembly 40 represented in FIGS. 2 through 6 can be installed in a high-bypass gas turbine engine 10 of the type represented in FIG. 1. While the assembly 40 can be adapted for installation at various locations of the engine 10, the assembly 40 is particularly intended to be installed between the fan cowl 12B and thrust reverser assembly 12C, for example, at a location of the nacelle 12 located axially between the high and low pressure compressor sections 22 and 24 of the engine 10.

The assembly 40 is represented as including two ring-type components, a first of which will be referred to as the fan case 42 and the second will be referred to as a fixed structure 44 of a thrust reverser assembly. As known in the art, the fan case 42 is a static structure within the fan cowl 12B that surrounds the fan blades 18 of the engine 10, and the fixed structure 44 may include the cascade 34B and other static parts of the thrust reverser assembly 12C of the engine 10. Accordingly, it should be understood that the ring-type components shown in the figures and identified as the fan case 42 and fixed structure 44 are only portions of, respectively, a fan case and thrust reverser assembly typically found in a high-bypass gas turbine engine of the type represented in FIG. 1. In particular, the component identified as the fan case 42 may be a portion of the entire structure that forms a fan case within the nacelle 12 of the engine 10, or a ring that is bolted or otherwise attached to a structure that together form a fan case of the engine 10. Similarly, the component identified as the fixed structure 44 may be a portion of the entire structure that forms the fixed structure (including the cascade 34B) of the thrust reverser assembly 12C of the engine 10, or a ring that is bolted or otherwise attached to a structure that together form the fixed structure of the thrust reverser assembly 12C. However, for convenience, the components will simply be referred to as the fan case 42 and fixed structure 44.

The assembly 40 is represented in FIGS. 2 through 6 as comprising a clamping system adapted to couple and decouple the fan case 42 and the fixed structure 44 to allow the thrust reverser assembly 12C to translate aft and away from the fan case 42. The clamping system is configured to provide a method for coupling and decoupling the fan case 42 and thrust reverser assembly 12C by simultaneously engaging and disengaging flanges 48 and 50 associated with, respectively, the fan case 42 and the fixed structure 44 of the thrust reverser assembly 12C. In particular, the clamping system comprises a plurality of over-center clamping mechanisms 52, some of which are mounted to the fan case 42 and others to the fixed structure 44. The coupling and decoupling method provided by the clamping system entails the movement of each clamping mechanism 52 to simultaneously clamp portions of the flanges 48 and 50 together, as well as simultaneously release the flanges 48 and 50.

Figure 4:
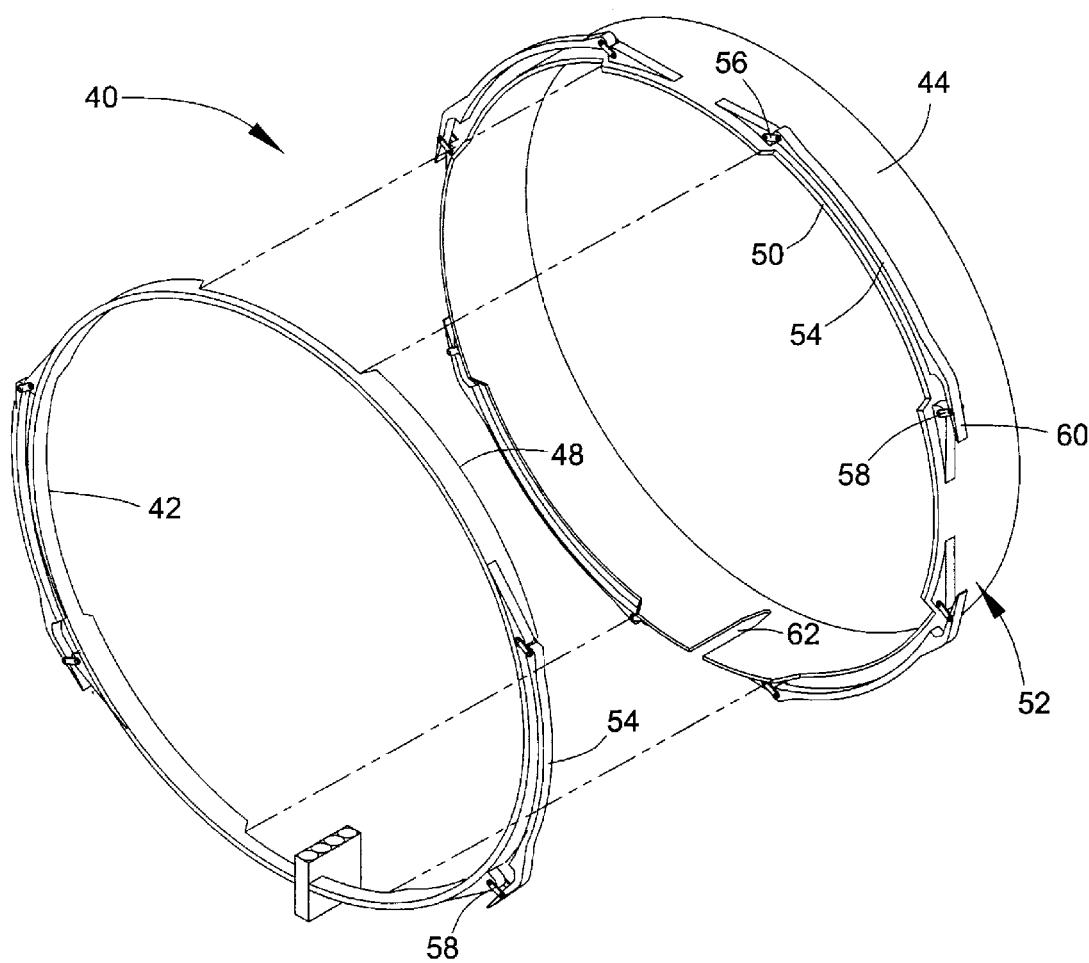
FIG. 4 is an isolated perspective view of the assembly of FIGS. 2 and 3 showing the portions of the fan case and fixed structure decoupled from each other through the operation of the multi-segment clamping system of the present invention.
Figure 5:
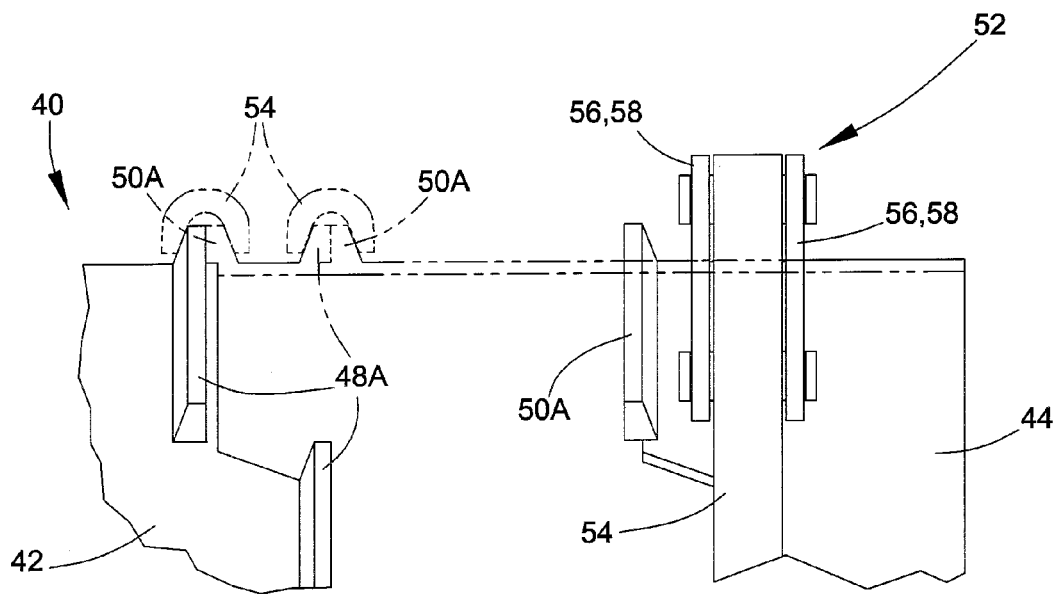
FIG. 5 is a detailed side view of a portion of the multi-segment clamping system of FIG. 4.

As represented in FIG. 5, the flange portions 48A and 50A preferably project in radially outward directions of the engine 10, so that the flange portions 48A and 50A lie in planes that are parallel to each other. As most readily evident from FIGS. 4 and 5, the flanges 48 associated with the fan case 42 comprise multiple axially-offset flange portions 48A that extend around different circumferential portions of the nacelle 12. Similarly, the flanges 50 associated with the fixed structure 44 comprise multiple axially-offset flange portions 50A that extend around different circumferential portions of the nacelle 12. The flange portions 48A of the fan case 42 and the flange portions 50A of the fixed structure 44 are complementarily axially offset and circumferentially located so that each flange portion 48A of the fan case 42 will mate with one of the flange portions 50A of the fixed structure 44. Each of the over-center clamping mechanisms 52 of the clamping system is also circumferentially and axially offset from each other, and dedicated to clamp one complementary pair of the flange portions 48A and 50A. Furthermore, each over-center clamping mechanism 52 is mounted to either the fixed structure 44 to clamp one of the flange portions 50A of the fixed structure 44 with one of the flange portions 48A of the fan case 42, or to the fan case 42 to clamp one of the flange portions 50A of the fixed structure 44 with one of the flange portions 48A of the fan case 42.

Each of the over-center clamping mechanisms 52 of the clamping system comprises a clamping segment 54 that extends over a circumferential portion of the nacelle 12, a pivot link 56 at one circumferential end of the clamping segment 54, and an over-center link 58 at an oppositely-disposed circumferential end of the clamping segment 54. Because each clamping mechanism 52 is mounted to either the fan case 42 or the fixed structure 44, each pair of pivot and over-center links 56 and 58 for each mechanism 52 is pivotably mounted to either the fan case 42 or the fixed structure 44. As evident from FIGS. 2, 3 and 4, in the circumferential direction of the assembly 40, the mechanisms 52 alternate between being mounted to the fan case 42 or to the fixed structure 44. Furthermore, the circumferential ends of the mechanisms 52 overlap each other as a result of their pivot and over-center links 56 and 58 being axially aligned with one of the pivot or over-center links 56 and 58 of an adjacent mechanism 52. The over-center link 58 cooperates with the pivot link 56 to induce an over-center toggle operation in the clamping segment 54. Due to the pivoting movement of the pivot and over-center links 56 and 58, the movement of the clamping segment 54 comprises both a radially outward travel and then a radially inward travel combined with a circumferential travel between a position of the mechanism 52 that clamps a pair of flange portions 48A and 50A together and a position of the mechanism 52 that releases the pair of flange portions 48A and 50A. As should be evident from FIGS. 2 through 6, an operator can readily cause each mechanism 52 to move between these two extremes by grasping a handle 60 that protrudes in a circumferential direction from the segment 54 adjacent the over-center link 58.

Those skilled in the art will appreciate that the configurations of the over-center clamping mechanisms 52 are based on the design of a Marman clamp, which is a well-know device for connecting pipe joints. However, the present invention uses a plurality of axially and circumferentially offset mechanisms 52 to achieve a large-diameter connection between the fan case 42 and the fixed structure 44 of the thrust reverser assembly 12C. The multiple mechanisms 52 are not only convenient to operate, but also provide a level of redundancy, retaining a secure connection even in the event of a failure of one or more of the mechanisms 52. An optimal number of mechanisms 52 will vary depending on the given application, though the use of two to eight mechanisms 52 is believed to be practical for many applications. The invention may further comprise means (not shown) for locking the handles 60 to secure the mechanisms 52 in the clamping position, as well as additional tensioning devices similar to latches.

Figure 2:
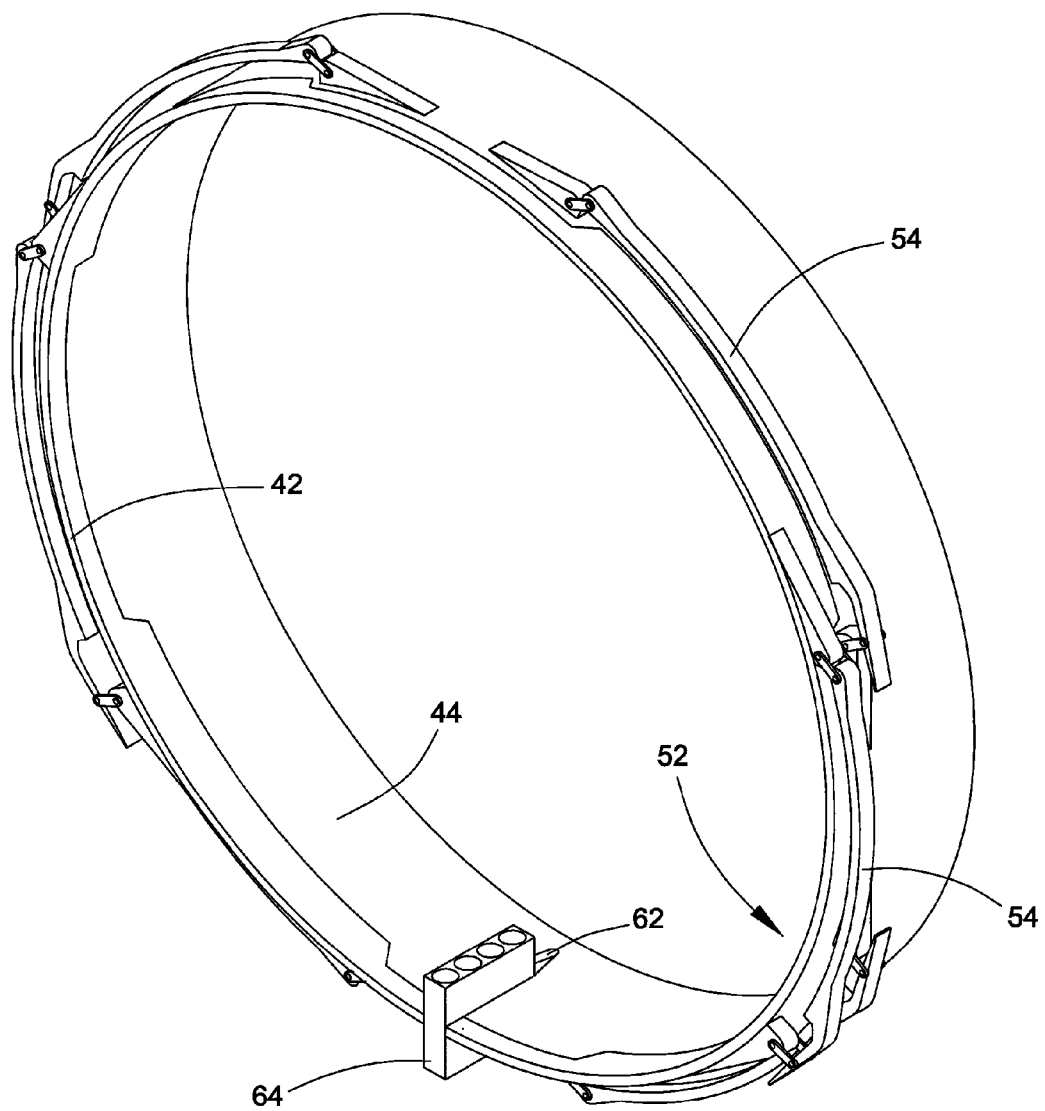
FIGS. 2 and 3 are isolated perspective and axial views, respectively, showing an assembly comprising portions of a fan case and a fixed structure of a thrust reverser assembly coupled together with a multi-segment clamping system of the present invention.
Figure 3:
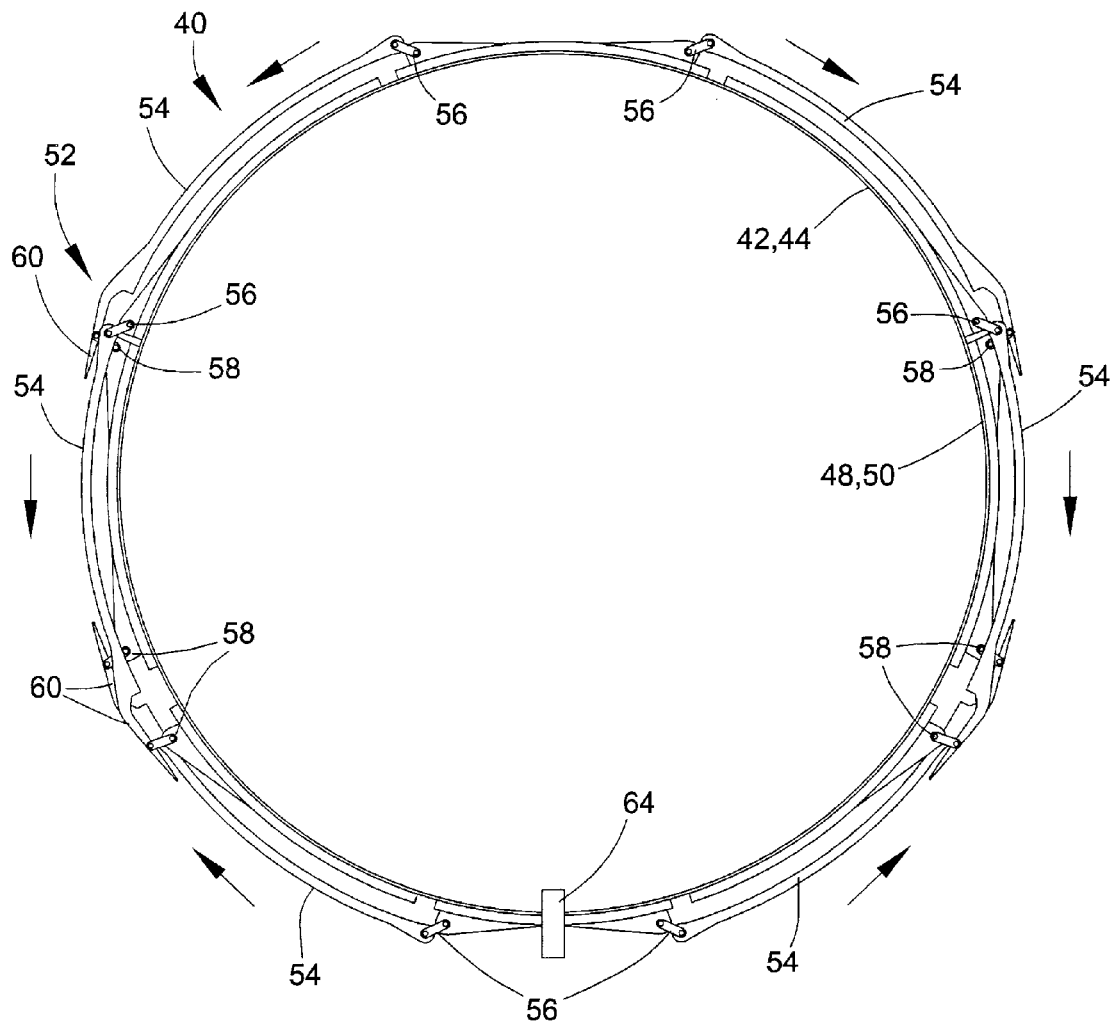
Figure 6:
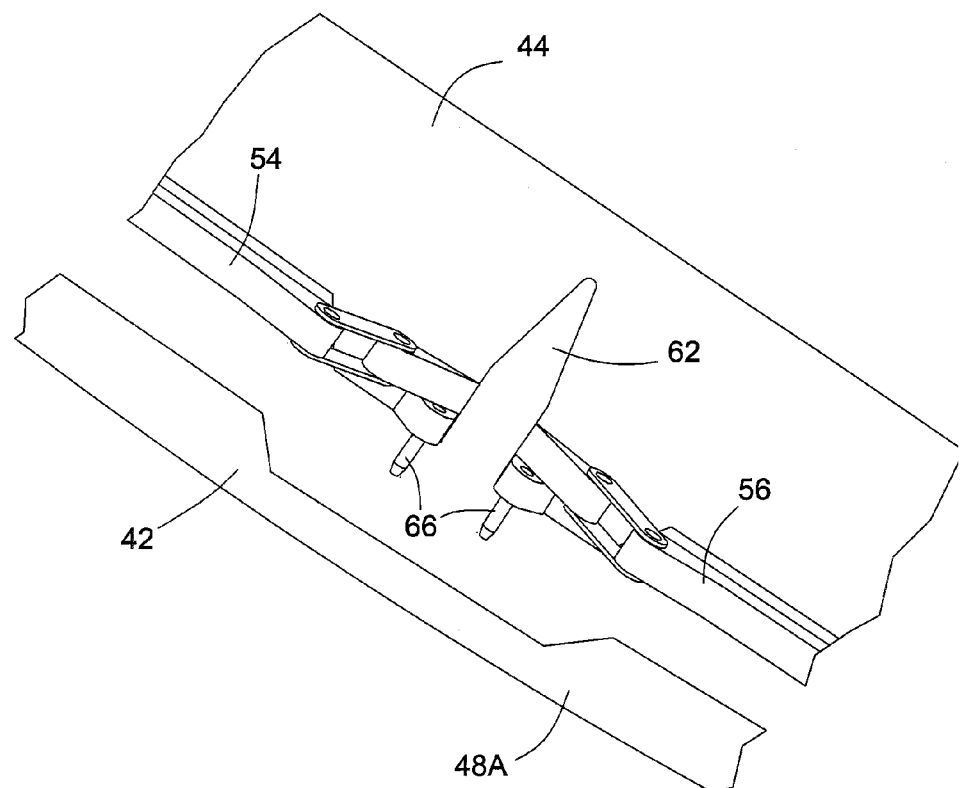
FIG. 6 is a detailed view of the multi-segment clamping system of FIG. 4 showing a cutout through which conduits can be routed through the assembly.

As shown in FIGS. 2 through 4 and more readily seen in FIG. 6, the assembly 40 can further comprise a cutout 62 through which conduits 64 of any type can be routed through the assembly 40. A gas-tight seal (not shown) can be provided to minimize or prevent air flow losses through the assembly 40. FIG. 6 further shows a pair of shear pins 66 located on either side of the cutout 62 to reinforce the structural strength of the assembly 40 in the vicinity of the cutout 62.

While the invention has been described in terms of a specific embodiment, it is apparent that other forms could be adopted by one skilled in the art. For example, the assembly 40 could differ in appearance and construction from the embodiment shown in the figures, the functions of each component of the assembly 40 could be performed by components of different construction but capable of a similar (though not necessarily equivalent) function, and various materials could be used in the construction of these components. Therefore, the scope of the invention is to be limited only by the following claims.

The invention claimed is:

1. A gas turbine engine having a nacelle comprising a fan case and a thrust reverser assembly disposed axially aft of the fan case, the thrust reverser assembly comprising a fixed structure configured to be translated to separate from the fan case, the fixed structure of the thrust reverser assembly being capable of coupling and decoupling from the fan case with a clamping system, the clamping system comprising:
   flanges associated with the fan case; and
   flanges associated with the fixed structure of the thrust reverser assembly and adapted for simultaneous mating with the flanges of the fan case when the fan case and the thrust reverser assembly are axially moved into engagement with each other; and
   a plurality of over-center clamping mechanisms, a first of the over-center clamping mechanisms being mounted to the fixed structure of the thrust reverser assembly and adapted to clamp a first of the flanges of the fixed structure with a first of the flanges of the fan case, a second of the over-center clamping mechanisms being mounted to the fan case and adapted to clamp a second of the flanges of the fixed structure with a second of the flanges of the fan case.

2. The gas turbine engine according to claim 1, wherein the plurality of over-center clamping mechanisms alternate between being mounted to the fan case or to the fixed structure.

3. The gas turbine engine according to claim 1, wherein circumferentially opposite ends of the plurality of over-center clamping mechanisms overlap each other.

4. The gas turbine engine according to claim 1, wherein each of the first and second over-center clamping mechanisms comprises:
   a clamping segment extending over a circumferential portion of the nacelle;
   a pivot link at a first circumferential end of the clamping segment; and
   an over-center link at an oppositely-disposed second circumferential end of the clamping segment, the over-center link cooperating with the pivot link to induce an over-center toggle operation in the clamping segment.

5. The gas turbine engine according to claim 4, wherein the pivot link of the first over-center clamping mechanism is axially aligned with at least one of the pivot or over-center links of the second over-center clamping mechanism.

6. The gas turbine engine according to claim 1, wherein each of the flanges associated with the fan case and the fixed structure extends over a circumferential portion of the nacelle.

7. The gas turbine engine according to claim 1, wherein each of the flanges associated with the fan case and the fixed structure projects in a radially outward direction of the gas turbine engine.

8. The gas turbine engine according to claim 7, wherein the flanges associated with the fan case and the fixed structure lie in planes that are parallel to each other.

9. The gas turbine engine according to claim 1, wherein the first and second flanges of the fan case are circumferentially and axially offset from each other relative to an axis of the gas turbine engine, and the first and second flanges of the fixed structure are circumferentially and axially offset from each other relative to the axis of the gas turbine engine.

10. The gas turbine engine according to claim 1, wherein the clamping system further comprises a cutout through which conduits can be routed through the clamping system and between the fan case and the fixed structure.

11. A gas turbine engine having a nacelle comprising a fan case and a thrust reverser assembly disposed axially aft of the fan case, the thrust reverser assembly comprising a fixed structure configured to be translated to separate from the fan case, the fixed structure of the thrust reverser assembly being capable of coupling and decoupling from the fan case with a clamping system, the clamping system comprising:
   flanges associated with the fixed structure of the thrust reverser assembly, the flanges comprising at least one first flange portion that extends around a first circumferential portion of the nacelle and at least one second flange portion that extends around a second circumferential portion of the nacelle and is circumferentially and axially offset from the first flange portion;
   flanges associated with the fan case and comprising at least one first flange portion that extends around the first circumferential portion of the nacelle and at least one second flange portion that extends around the second circumferential portion of the nacelle and is circumferentially and axially offset from the first flange portion of the fan case, the first and second flange portions of the fan case being adapted to simultaneous mate with the first and second flange portions, respectively, of the fixed structure when the fan case and the thrust reverser assembly are axially moved into engagement with each other; and
   a plurality of over-center clamping mechanisms that are circumferentially and axially offset from each other, a first of the over-center clamping mechanisms being mounted to the fixed structure of the thrust reverser assembly and adapted to clamp the first flange portion of the fixed structure with the first flange portion of the fan case, a second of the over-center clamping mechanisms being mounted to the fan case and adapted to clamp the second flange portion of the fixed structure with the second flange portion of the fan case.

12. The gas turbine engine according to claim 11, wherein each of the first and second over-center clamping mechanisms comprises:
   a clamping segment extending over one of the first or second circumferential portions of the nacelle;
   a pivot link at a first circumferential end of the clamping segment thereof; and
   an over-center link at an oppositely-disposed second circumferential end of the clamping segment thereof, the over-center link cooperating with the pivot link to induce an over-center toggle operation in the clamping segment.

13. The gas turbine engine according to claim 11, wherein:
   the flanges associated with the fixed structure of the thrust reverser assembly comprise a plurality of the first flange portion and a plurality of the second flange portion that are circumferentially and axially offset from the first flange portions of the fixed structure;
   the flanges associated with the fan case comprise a plurality of the first flange portion and a plurality of the second flange portion that are circumferentially and axially offset from the first flange portions of the fan case; and
   the first flange portions of the fan case and the fixed structure define first complementary pairs of flange portions, and the second flange portions of the fan case and the fixed structure define second complementary pairs of flange portions.

14. The gas turbine engine according to claim 11, wherein each of the flanges associated with the fan case and the fixed structure projects in a radially outward direction of the gas turbine engine, and the flanges associated with the fan case and the fixed structure lie in planes that are parallel to each other.

15. The gas turbine engine according to claim 11, wherein circumferentially opposite ends of the plurality of over-center clamping mechanisms overlap each other.

16. A method of coupling and decoupling a fan case and a thrust reverser assembly of a nacelle of a gas turbine engine, the thrust reverser assembly being disposed axially aft of the fan case, the thrust reverser assembly comprising a fixed structure configured to be translated to separate from the fan case, flanges associated with the fan case, a clamping system comprising: flanges associated with the fixed structure of the thrust reverser assembly and adapted to simultaneous mating with the flanges of the fan case when the fan case and the thrust reverser assembly are axially moved into engagement with each other, a plurality of over-center clamping mechanisms, a first of the over-center clamping mechanisms being mounted to the fixed structure of the thrust reverser assembly and adapted to clamp a first of the flanges of the fixed structure with a first of the flanges of the fan case, a second of the over-center clamping mechanisms being mounted to the fan case and adapted to clamp a second of the flanges of the fixed structure with a second of the flanges of the fan case, the method comprising:
    operating the clamping system to simultaneously engage at least one flange associated with the fan case and at least one flange associated with the fixed structure of the thrust reverser assembly, the operating step comprising movement of at least one over-center clamping mechanism to simultaneously clamp together the at least one flanges of the fan case and the fixed structure.

17. The method according to claim 16, wherein each of the over-center clamping mechanisms is adapted to simultaneously engage and disengage a complementary pair of the flanges associated with the fan case and the fixed structure, and the operating step comprises movement of each of the over-center clamping mechanisms to clamp together the complementary pairs of the flanges of the fan case and the fixed structure.

18. The method according to claim 17, wherein the operating step comprises individually moving each of the over-center clamping mechanisms to clamp together individual complementary pairs of the flanges of the fan case and the fixed structure.

19. The method according to claim 17, wherein the over-center clamping mechanisms are circumferentially and axially offset from each other relative to an axis of the gas turbine engine.

20. The method according to claim 17, further comprising:
    operating each of the over-center clamping mechanisms to disengage the complementary pairs of the flanges of the fan case and the fixed structure; and then
    translating the fixed structure to separate the thrust reverser assembly from the fan case.

* * * * *